United States Patent
Hazlebeck

(10) Patent No.: US 7,736,471 B2
(45) Date of Patent: Jun. 15, 2010

(54) MATERIAL TREATMENT SYSTEMS FOR WASTE DESTRUCTION, ENERGY GENERATION, OR THE PRODUCTION OF USEFUL CHEMICALS

(75) Inventor: David A. Hazlebeck, El Cajon, CA (US)

(73) Assignee: General Atomics, San Diego, CA (US)

( * ) Notice: Subject to any disclaimer, the term of this patent is extended or adjusted under 35 U.S.C. 154(b) by 388 days.

(21) Appl. No.: 11/119,642

(22) Filed: May 2, 2005

(65) Prior Publication Data

US 2006/0243582 A1    Nov. 2, 2006

(51) Int. Cl.
C10B 51/00 (2006.01)
C10B 57/04 (2006.01)
C10B 9/00 (2006.01)

(52) U.S. Cl. ............... 202/96; 202/208; 201/25; 585/240; 585/241; 585/242; 422/199; 219/121.27; 219/121.37

(58) Field of Classification Search ............ 201/25; 202/96, 208; 219/121.27, 121.37; 422/199; 585/240, 241, 242
See application file for complete search history.

(56) References Cited

U.S. PATENT DOCUMENTS

| | | |
|---|---|---|
| 3,736,111 A | 5/1973 | Gardener et al. |
| 3,912,626 A | 10/1975 | Ely et al. |
| 4,141,828 A | 2/1979 | Okada et al. |
| 4,466,807 A | 8/1984 | Santen et al. |
| 4,543,190 A | 9/1985 | Modell |
| 4,792,407 A | 12/1988 | Zeff et al. |
| 5,075,017 A | 12/1991 | Hossain et al. |
| 5,280,757 A | 1/1994 | Carter et al. |
| 5,484,978 A | 1/1996 | Hedberg et al. |
| 5,811,752 A * | 9/1998 | Titus et al. ............. 219/121.37 |
| 6,630,113 B1 * | 10/2003 | Surma ......................... 422/199 |

* cited by examiner

Primary Examiner—In Suk Bullock
Assistant Examiner—Prem C. Singh
(74) Attorney, Agent, or Firm—Nydegger & Associates

(57) ABSTRACT

A system for treating a feedstock for the purposes of waste destruction, energy generation, or the production of useful chemicals is disclosed and includes a reactor vessel. A heating lance is configured to outflow the products of a partial oxidation reaction into a reaction chamber in the vessel. The hot reaction products heat and pyrolyze the feedstock in the chamber generating a process effluent which typically includes gases (e.g. syn-gas) and carbon solids. Glasses and metals in the feedstock accumulate in the chamber in a molten state. The molten materials store thermal energy and provide thermal stability to the treatment system. A recycle loop uses carbon solids from the process effluent as an input to the lance for reaction with an oxidant therein.

15 Claims, 2 Drawing Sheets

MATERIAL TREATMENT SYSTEMS FOR WASTE DESTRUCTION, ENERGY GENERATION, OR THE PRODUCTION OF USEFUL CHEMICALS

The U.S. Government has a paid-up license in this invention and the right in limited circumstances to require the patent owner to license others on reasonable terms as provided for by the terms of Contract No. FA8651-04-C-0158 awarded by the United States Air Force.

FIELD OF THE INVENTION

The present invention pertains generally to systems and methods for treating materials for the purposes of waste destruction, energy generation, or the production of useful chemicals. More specifically, the present invention pertains to efficient systems and methods for treating waste materials having organic constituents. The present invention is particularly, but not exclusively, useful as a system and method for pyrolyzing a feed material and using the resulting carbon solids in a recycle loop to heat and pyrolyze incoming feed material.

BACKGROUND OF THE INVENTION

The long-term storage of waste in landfills can be problematic for several reasons. First, landfill space is limited. On the other hand, the production of waste materials seems to be increasing at an ever-incredible pace. Moreover, conventional landfills can pose serious environmental problems including the contamination of nearby groundwater and the generation of air pollutants. Unfortunately, the treatment and recycling of most conventional forms of waste remains a serious challenge. As a minimum, an effective treatment/recycling solution must be energy efficient and present minimal environmental risks.

In general, conventional treatment/recycling schemes have been somewhat limited when applied to mixed wastestreams and wastestreams that include bulk solids. For example, consider a continuous feed, high pressure system for processing waste. The pressurized nature of these processes typically requires that bulk solids be ground to a fine particle size to allow the pumping of the particularized solids into a high pressure reactor. Both grinding and pumping can require specialty equipment. In particular, a different device is generally required for different materials such as wood, plastic, or friable solids. Once the material has been ground, introduction into a pressurized reactor usually requires slurrying the material at a high concentration to minimize the size of the reactor and associated process equipment. Thus, expensive, high pressure slurry pumps for viscous streams are typically required. For other solids such as metals, glass or ceramics, suitable size-reduction for introduction into a pressurized reactor vessel is generally impractical.

In addition to conventional wastestreams, a large amount of waste is generated each year that is hazardous and cannot be placed in a conventional landfill unless it is pre-treated. Among this hazardous waste is a large amount of mixed waste consisting of non-hazardous solids that are contaminated with hazardous constituents. Examples of such mixed wastes include soils, inorganic adsorbents and other solids that are contaminated with hazardous organic materials. Another such mixed waste consists of conventional and chemical munitions as well as munition dunnage. Protective suits, munition bodies and equipment contaminated with energetics, biological or chemical warfare agents is another mixed waste that cannot be safely placed in a conventional landfill without pretreatment. Similarly, PCB contaminated transformers, pesticide contaminated bags and containers, medical/biohazard waste such as contaminated needles and glass containers, and computer waste that can include lead and other hazardous materials are all mixed wastes that cannot be safely placed in a conventional landfill.

Another factor that must be considered when contemplating the treatment/recycling of materials is the generation of treatment by-products that can present handling difficulties and in some cases interfere with the treatment process. For example, when supercritical water oxidation (SCWO) type processes are used to treat wastestreams, sticky solids are often generated that can plug a reactor vessel, absent special precautions. In a similar manner, when low and moderate temperatures are used as part of a treatment process, organics that are present in a wastestream often generate tars which are difficult to handle and process. Similarly, partial oxidation gasification systems typically generate dirty process effluents and can be difficult to control because of variations in the heat capacity, water content, and reactivity of the wastes.

Perhaps the most important consideration when considering the treatment/recycling of waste is the energy required to process the waste. Depending on the process, significant amounts of energy may be required to heat the waste, pressurize or depressurize a reactor vessel, and/or mix and transport the waste. Heretofore, processes such as plasma arc pyrolysis and other electrically heated systems have typically required large amounts of power to heat and vaporize the waste. For this reason, these processes typically cannot generate net power and as a consequence have not been widely adopted.

In light of the above, it is an object of the present invention to provide systems and methods suitable for the purposes of efficiently treating feedstocks such as wastestreams which do not generate sticky solids or tars. It is another object of the present invention to provide systems and methods for treating feedstocks for the purpose of waste destruction, energy generation, or the production of useful chemicals. Yet another object of the present invention is to provide systems and methods for chemically converting feedstocks which are energy efficient, simple, and economical.

SUMMARY OF THE INVENTION

The present invention is directed to systems and methods for treating a feedstock for the purposes of waste destruction, energy generation, or the production of useful chemicals. For the treatment system, a reactor vessel is provided that is formed with a reaction chamber. The vessel is further formed with one or more inlets to allow the feedstock to be introduced into the reaction chamber. In addition to the inlet, the reactor vessel is formed with an opening to allow a heating lance to outflow the products of an oxidation reaction into the reaction chamber. These hot reaction products outflowing from the lance are used to heat the feedstock and pyrolyze organics in the feedstock. In quantitative terms, the reaction chamber is generally maintained at temperatures above about 1100 degrees Celsius for most types of feedstocks, and is typically maintained between 1300 and 1600 degrees Celsius.

Pyrolysis of the feedstock in the reaction chamber generates a process effluent which typically includes, but is not necessarily limited to, syn-gas and carbon solids. If present, solid glasses and metals in the feedstock melt upon exposure to the hot reactor chamber and accumulate at the bottom of the chamber. The accumulated molten glass and metal efficiently store thermal energy and provide thermal stability to the treatment system.

For the treatment system, a recycle loop is established to introduce carbon solids from the process effluent into the lance for oxidation therein. In greater detail, the process effluent, which includes gases and carbon solids, is evacuated from the reaction chamber, for example, using a blower. In one embodiment, the carbon solids are then separated from the process effluent using a baghouse. From the baghouse, the carbon solids are introduced into the heating lance for reaction with an oxidant, such as oxygen, from an oxidant source.

In a particular implementation of the treatment system, a sub-stoichiometric amount of oxidant is introduced into the lance which results in a partial oxidation of the carbon solids therein. Moreover, the lance inputs are generally controlled such that the reaction between the oxidant and carbon solids is completed in the lance and prior to the outflow of reaction products from the lance into the reaction chamber. Thus, for this implementation, the reaction chamber can be maintained in an overall net-reducing state.

In one embodiment of the treatment system, the blower draws the process effluent through a plasma polisher which pyrolyzes any gaseous organic molecules that are present in the process effluent. Typically, the blower maintains the pressure inside the reactor chamber at sub-atmospheric levels. From the plasma polisher, the effluent can be cooled and then sent to the baghouse for removal of the carbon solids. In addition, heat can be exchanged between the hot process effluent and the colder feedstock that is entering the reaction chamber. In some cases, gases exiting the baghouse are treated to remove acids. The remaining gases are then further processed. For example, hydrogen can be isolated from the remaining gases and stored for subsequent use as a product of the process. If desired, the syn-gas can be compressed and stored for subsequent use. In one implementation, the syn-gas can be input into the lance to supplement the carbon solids in the partial oxidation reaction. Alternatively, or in addition thereto, the syn-gas can be used to stir the molten materials in the reaction chamber. This stirring can be used to increase the heat transfer to the incoming feedstock. Also, gases from the separator can be used to drive an engine or turbine. Moreover, the waste heat from the engine/turbine can be used to heat, and in some cases, dry the feedstock entering the reactor chamber.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
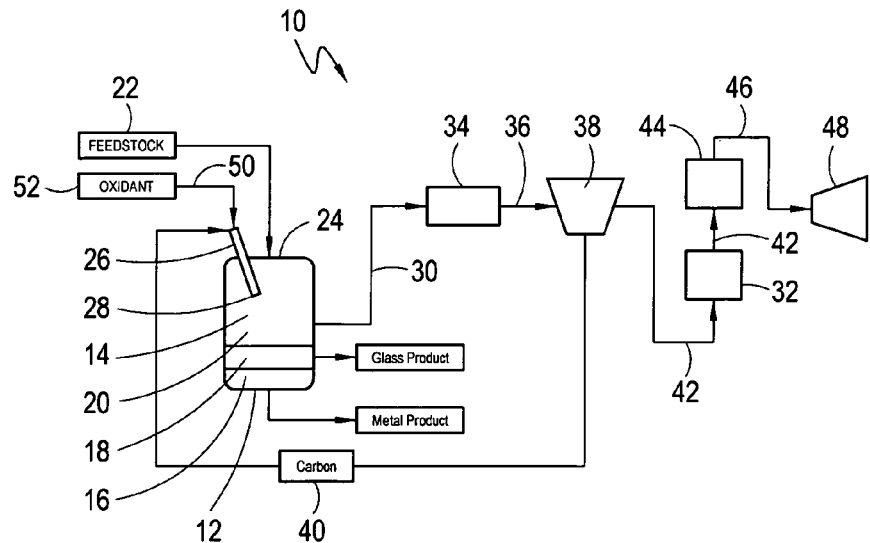
FIG. 1 is a schematic diagram of a treatment system showing the system components and flow paths for the various system reactants and products.

Referring initially to FIG. 1, a treatment system is shown and generally designated 10. As shown, the system 10 includes a reactor vessel 12 that is formed with a reaction chamber 14. FIG. 1 shows the reactor vessel 12 during a typical steady state operation. During this operation, it can be seen that the chamber 14 contains a molten metal layer 16, a molten glass layer 18 and a headspace 20 above the molten layers 16, 18. It can be further seen from FIG. 1 that a feedstock 22 is introduced into the headspace 20 via an inlet 24. Although one inlet 24 is shown, it is to be appreciated that the vessel 12 can be formed with two or more feedstock inlets 24 to allow for improved mixing, improved feed rate or improved heat transfer between the molten layers 16, 18 and the feedstock 22. FIG. 1 also shows that the system 10 includes a heating lance 26 having an outflow end 28 that is positioned in the headspace 20 of the reaction chamber 14.

For the system 10, the feedstock 22 typically contains an organic (i.e. carbon based) material and can include one or more waste materials, one or more raw materials, or combinations thereof. Waste materials can include, but are not limited to, municipal solid waste including waste specific streams (e.g. computer waste, battery waste, medical waste, etc.), sewage, biologically digested sewage, biological sludge and regulated hazardous wastes. Alternately, or in addition to waste materials, the feedstock 22 can include one or more raw materials such as an oil-based hydrocarbon. It is to be appreciated that the feedstock 22 can be processed for one or more purposes to include treating and/or recycling of waste materials, the production of energy (e.g. net power) and the generation of usable chemicals (e.g. hydrogen, syn-gas, glass, metal, etc.).

Continuing with FIG. 1, the feedstock 22 is introduced into the chamber 14 where it is rapidly heated by the hot reaction products generated by the lance 26 and the heat contained in the molten layers 16, 18. For the system 10, the reaction chamber 14 is generally maintained at a temperature above about 1100 degrees Celsius for most types of feedstocks 22 and is typically maintained between about 1300 and 1600 degrees Celsius. Introduction of the feedstock 22 into the hot reaction chamber 14 can result in one or more reactions to include pyrolysis, gasification and vitrification reactions. In general, the rapid heating of the feedstock 22 avoids the formation of tars (i.e. complex organic compounds and hydrocarbons) and ensures the complete destruction of wastes. These reactions generate a process effluent 30 which is then evacuated from the headspace 20 by a blower 32. In most cases, the blower 32 is configured to maintain the pressure inside the reactor chamber 14 at slightly sub-atmospheric levels. Typically, the process effluent 30 includes, but is not necessarily limited to, syn-gas and fine, divided carbon solids. When glasses and/or metals are present in the feedstock 22, these materials typically melt upon exposure to the heat in the reactor chamber 14 and accumulate at the bottom of the chamber 14 as layers 16, 18. The accumulated molten glass and metal functions to trap inorganic materials in the melt, efficiently store thermal energy and provide thermal stability to the treatment system 10. The molten glass and metal can be periodically removed from the vessel 12. For example, the vessel 12 can be formed with one or more holes (not shown) that accommodate removable plugs (e.g. clay plugs). In addition, the vessel 12 can include a heater, such as an induction heater (not shown), to maintain the molten layers 16, 18 at a preselected temperature.

As further shown in FIG. 1, the process effluent 30 exiting the chamber 14 is first drawn into a gas cooler 34 which reduces the temperature of the process effluent 30. From the gas cooler 34, the cooled process effluent 36 is directed into a baghouse 38 where the finely divided carbon solids 40 are separated from the remaining gases 42. From the baghouse 38, the filtered gases 42 pass through the blower 32 and are directed toward a treatment unit 44 where the gases 42 are conditioned by wet or dry removal of acid gases. The conditioned gas 46 exiting the unit 44 is then used (e.g. burned) to produce mechanical energy in an energy conversion device 48, which is typically an engine or turbine.

With continued reference to FIG. 1, it can be seen that the carbon solids 40 from the baghouse 38 are held in a hopper (not shown) and thereafter fed in a controlled fashion into the heating lance 26. Transport to the lance 26 from the hopper can be accomplished, for example, using a fluidizing carrier. In one implementation, syn-gas from the reactor effluent 30 can be used to fluidize and transport the carbon solids 40 to the lance 26. In the lance 26, the finely divided carbon solids 40 are reacted with an oxidant 50 from an oxidant source 52. Suitable carbon lances for use in the system 10 can be obtained from Process Technology Intl., headquartered in Tucker, Ga.

Typically, for the system 10, a sub-stoichiometric amount of oxidant 50 is introduced into the lance 26 which results in a partial oxidation of the carbon solids 40 therein. Also, the lance 26 inputs are generally controlled such that the reaction between the oxidant 50 and carbon solids 40 is completed in the lance 26 and prior to outflow of the partial oxidation products into the reactor chamber 14. Because the oxidation reactions come to completion in the lance 26, the variability of the feedstock 22 does not significantly affect the thermal performance of the lance 26. The outflow stream from the lance 26 typically consists of jet of carbon monoxide and carbon dioxide with little or no free oxidizers entering the chamber 14. With this control, the lance 26 provides a stable, adjustable heat source while allowing the reactor chamber 14 to be maintained in an overall net-reducing state. Although only one lance 26 is shown, it is to be appreciated that two or more lances 26 can be used in the system 10 and that the jet(s) from the lance(s) 26 can be directed into the molten layers 16, 18 to stir the melt and increase heat transfer from the melt to the incoming feedstock 22.

Figure 2:
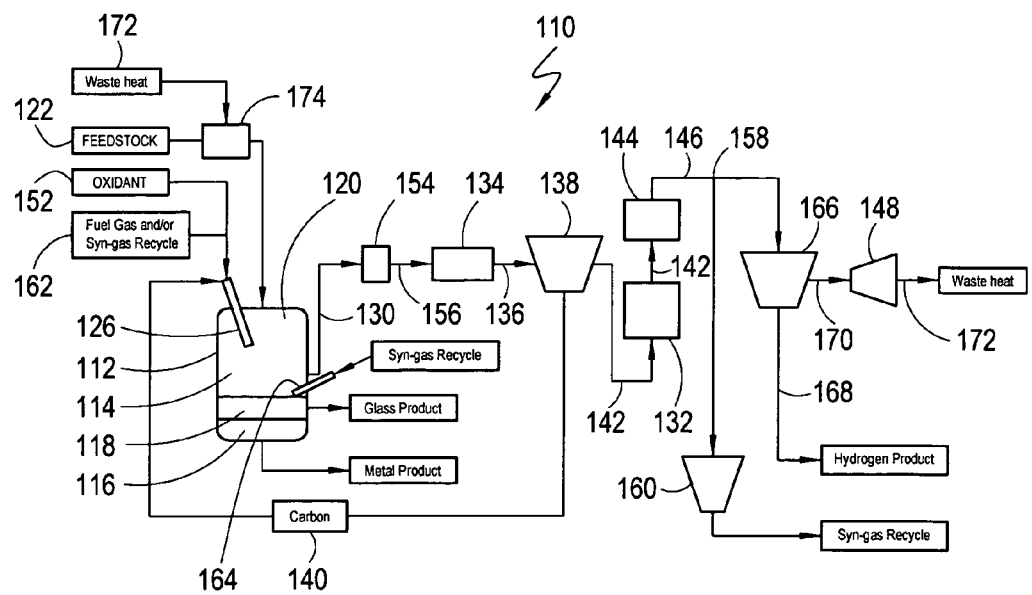
FIG. 2 is a schematic diagram of another embodiment of a treatment system having an apparatus for compressing and storing syn-gas and an apparatus for separating and storing hydrogen gas from the process effluent.

FIG. 2 shows another embodiment of a treatment system (generally designated system 110). For this embodiment, the system 110 includes a reactor vessel 112 that is formed with a reaction chamber 114 which, in operation, typically contains a molten metal layer 116, a molten glass layer 118 and establishes a headspace 120 above the molten layers 116, 118. The feedstock 122 is introduced into the chamber 114 where it is rapidly heated by the heat generated by the lance 126 and the heat contained in the molten layers 116, 118. A process effluent 130, which typically includes syn-gas and fine, divided carbon solids, is generated and is evacuated from the headspace 120 by a blower 132.

As further shown in FIG. 2, the process effluent 130 exiting the chamber 114 is first drawn into a plasma polisher 154 by the blower 132. At the plasma polisher 154, gaseous organic molecules in the process effluent 130 are reduced and pyrolyzed by a plasma arc. Because the process effluent 130 is relatively hot entering the plasma polisher 154, plasma energy input requirements to heat the effluent 130, vaporize volatiles and melt solids are typically greatly reduced. FIG. 2 further shows that the polished effluent 156 exiting the plasma polisher 154 is drawn into a gas cooler 134 which reduces the temperature of the process effluent 130. From the gas cooler 134, the cooled process effluent 136 is directed into a baghouse 138 where finely divided carbon solids 140 are separated from the remaining gases 142 and directed to the heating lance 126. It is to be appreciated that recycled carbon 140 can be supplemented by adding additional carbon feed material, such as coke. From the baghouse 138, the filtered gases 142 pass through the blower 132 and are directed toward a treatment unit 144 wherein the gases 142 are conditioned by wet or dry removal of acid gases. The conditioned gas 146 exiting the unit 144 is then directed to a tee 158.

Continuing with FIG. 2, the tee 158 allows a portion or all of the conditioned gas 146 to be directed to a syn-gas compressor 160 which compresses the syn-gas for subsequent storage and use. Two such uses of the syn-gas are shown in FIG. 2. In particular, syn-gas 162 can be introduced, alone or with fuel gas, into the lance 126 for reaction with the oxidant 152, as shown. The fuel gas is typically used to stabilize the reaction in the heating lance 126 and for system start-up. In addition, the syn-gas can be used to purge ports such as the inlet to the reactor chamber 114 and can be introduced into the reaction chamber 114 to stir the molten layers 116, 118, for example, using a wand 164. In one implementation, a portion of the effluent gas 130 is bubbled through the melt to mix the molten materials therein. Also, a small amount of air or oxygen can be injected below the melt surface to mix the melt and to oxidize carbon in the melt either directly or indirectly. An example of indirect oxidation can include the direct oxidization of iron followed by the oxidation of carbon in a reduction reaction with the iron oxides. In addition, the syn-gas from the process can be used to produce other useful compounds via thermal integration with basic process.

FIG. 2 also shows that the tee 158 allows a portion or all of the conditioned gas 146 to be directed to a hydrogen separation unit 166 which separates hydrogen 168 from the remaining gases 170 for subsequent storage and use. As shown, the gases 170 can be used to produce mechanical energy in an energy conversion device 148, which is typically an engine or turbine. The engine, in turn, can be used to power the hydrogen separation unit 166. FIG. 2 also shows that the waste heat 172 produced by the energy conversion device 148 can be used to dry and preheat the feedstock 122 in a preheat exchanger 174. Typically, the preheat exchanger 174 is controlled to heat the feedstock 122 at temperatures less than about 250 degrees Celsius to avoid gasification and the formation of tars (which can occur during slow heating at higher temperatures). In one implementation, the waste heat 172 is used to produce steam as a heat transfer medium to ensure that the flow of heat to the feedstock 122 is at an appropriate temperature.

Figure 3:
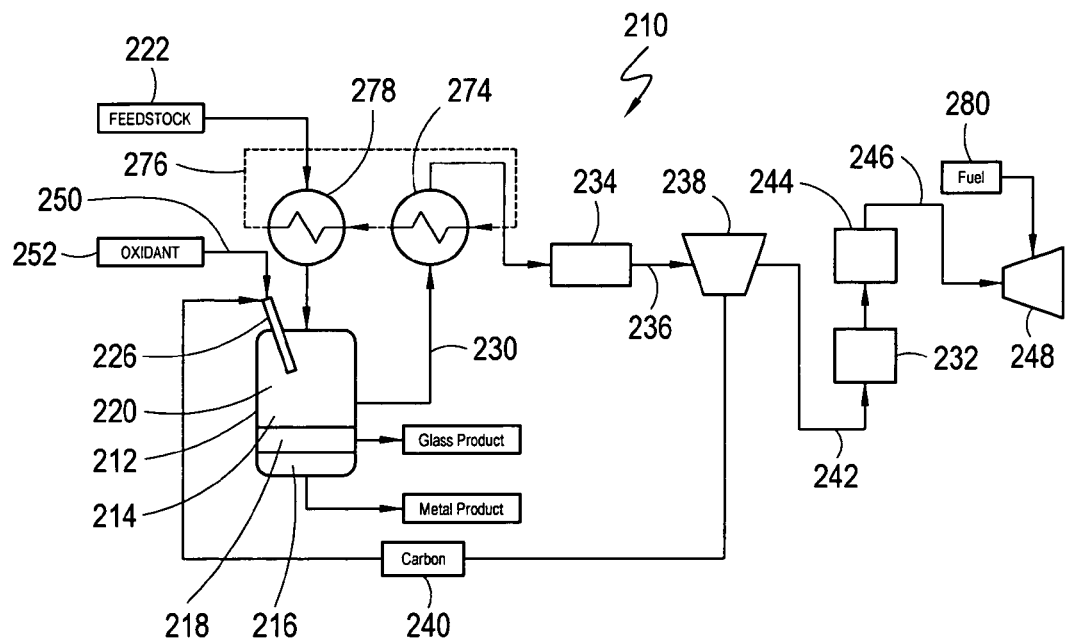
FIG. 3 is a schematic diagram of yet another embodiment of a treatment system having a heat exchanger for using the hot reactor effluent to heat and dry the feedstock.

FIG. 3 shows a third embodiment of a treatment system (generally designated system 210). As shown, the system 210 includes a reactor vessel 212 that is formed with a reaction chamber 214 which in a typical operation contains a molten metal layer 216, a molten glass layer 218 and establishes a headspace 220 above the molten layers 216, 218. A feedstock 222 is introduced into the chamber 214 where it is rapidly heated by the lance 226 and the heat contained in the molten layers 216, 218. A process effluent 230, which typically includes syn-gas and fine, divided carbon solids, is generated and is evacuated from the headspace 220 by a blower 232.

As further shown in FIG. 3, the relatively hot process effluent 230 exiting the chamber 214 is drawn through a heat exchanger 274 which transfers heat to an exchange fluid 276. The exchange fluid 276, in turn, passes through a second heat exchanger 278 and transfers heat to the feedstock 222. This heat exchange can be used to dry and preheat the feedstock 222. In particular, the heat exchanger 278 is controlled to heat and dry the feedstock 222 at temperatures less than about 250 degrees Celsius to avoid gasification and the formation of tars (which can occur during slow heating at higher temperatures).

Continuing with FIG. 3, it can be seen that from the heat exchanger 274, the process effluent 230 is drawn through a gas cooler 234 which reduces the temperature of the process effluent 230. From the gas cooler 234, the cooled process effluent 236 is directed into a baghouse 238 where finely divided carbon solids 240 are separated from the remaining gases 242. The carbon solids 240 are directed to the heating lance 226 for reaction with oxidant 250 from oxidant source 252. From the baghouse 238, the filtered gases 242 pass through the blower 232 and are directed toward a treatment unit 244 where the gases 242 are conditioned by wet or dry removal of acid gases. The conditioned gas 246 exiting the unit 244 is then directed to an energy conversion device 248 (e.g. an engine or turbine) for use in producing mechanical energy. As FIG. 3 shows, an auxiliary fuel 280 can be supplied to the energy conversion device 248 to accommodate variations in the quality of the conditioned gas 246.

Figure 4:
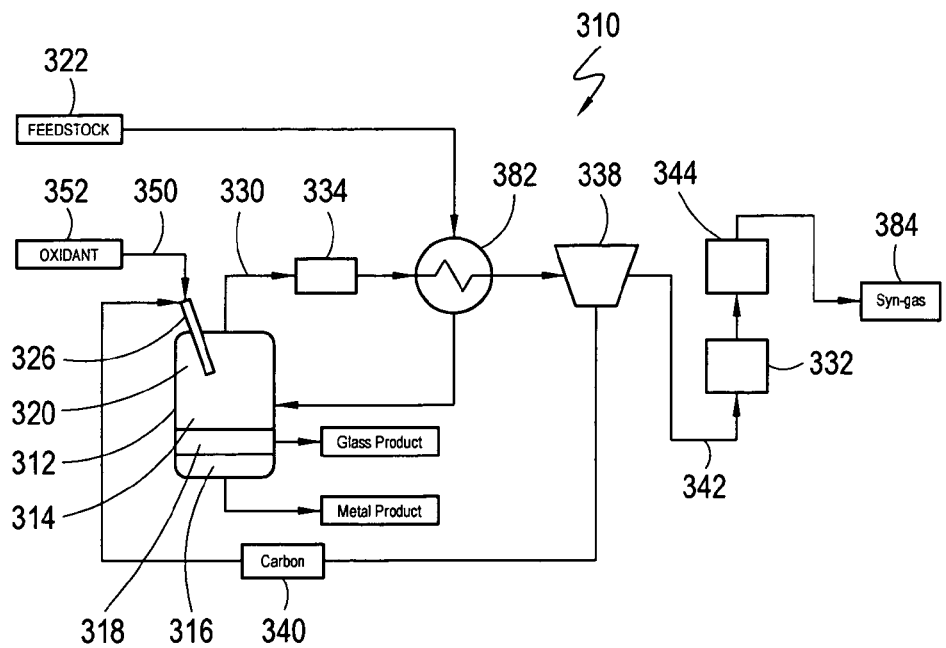
FIG. 4 is a schematic diagram of still another embodiment of a treatment system having a gas cooler and heat exchanger which cooperate to heat the feedstock in a controlled manner using heat from the hot reactor effluent.

FIG. 4 shows a fourth embodiment of a treatment system (generally designated system 310). As shown, the system 310 includes a reactor vessel 312 that is formed with a reaction chamber 314 which contains a molten metal layer 316, a molten glass layer 318 and establishes a headspace 320 above the molten layers 316, 318. A feedstock 322 is introduced into the chamber 314 where it is rapidly heated by the lance 326 and the heat contained in the molten layers 316, 318. A process effluent 330, which typically includes syn-gas and fine, divided carbon solids, is generated and is evacuated from the headspace 320 by a blower 332.

As further shown in FIG. 4, the relatively hot process effluent 330 exiting the chamber 314 is first drawn through a gas cooler 334 and then through a heat exchanger 382 which transfers heat from the effluent 330 to the feedstock 322. This heat exchange can be used to dry and preheat the feedstock 322. In particular, gas cooler 334 and heat exchanger 382 are controlled to heat and dry the feedstock 322 at temperatures less than about 250 degrees Celsius to avoid gasification and the formation of tars (which can occur during slow heating at higher temperatures).

Continuing with FIG. 4, it can be seen that from the heat exchanger 382, the process effluent 330 is directed into a baghouse 338 where finely divided carbon solids 340 are separated from the remaining gases 342. The carbon solids 340 are directed to the heating lance 326 for reaction with oxidant 350 from oxidant source 352. From the baghouse 338, the filtered gases 342 pass through the blower 332 and are directed toward a treatment unit 344 where the gases 342 are conditioned by wet or dry removal of acid gases. The conditioned syn-gas 384 is then stored for subsequent use.

While the particular Material Treatment Systems For Waste Destruction, Energy Generation, or the Production of Useful Chemicals and corresponding methods of use as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. A method for treating a feedstock, the method comprising the steps of:
    providing a reactor vessel having a reaction chamber;
    inputting the feedstock into the reaction chamber;
    connecting an oxidant source to a heating lance having an outflow end;
    introducing carbon solids and a sub-stoichiometric amount of oxidant into the lance;
    positioning the outflow end of the heating lance in the reaction chamber for outflow of partial oxidation products including carbon monoxide and carbon dioxide into the reaction chamber;
    operating the heating lance to pyrolyze at least a portion of the feedstock and produce a process effluent for evacuation from the reaction chamber, wherein the process effluent includes gas and carbon solids; and
    introducing at least a portion of the carbon solids generated in the operating step into the lance for partial oxidation therein, wherein oxidation reactions come to completion within the lance to maintain an overall net-reducing state in the reaction chamber.

2. A method as recited in claim 1 further comprising the steps of:
    accumulating molten glass treatment products in the reaction chamber; and
    selectively removing the products from the reaction chamber.

3. A method as recited in claim 1 further comprising the steps of:
    accumulating molten metal treatment products in the reaction chamber; and
    selectively removing the products from the reaction chamber.

4. A method as recited in claim 1 wherein the feedstock comprises computer waste.

5. A method as recited in claim 1 wherein the feedstock comprises a raw material.

6. A method for treating a feedstock, the method comprising the steps of:
    providing a reactor vessel having a reaction chamber;
    disposing at least a portion of the feedstock in the reaction chamber;
    connecting an oxidant source to a heating lance having an outflow end;
    introducing carbon solids and a sub-stoichiometric amount of oxidant into the lance;
    positioning the outflow end of the heating lance in the reaction chamber for outflow of partial oxidation products consisting of carbon monoxide and carbon dioxide into the reaction chamber;
    operating the heating lance to pyrolyze at least a portion of the feedstock and produce a process effluent for evacuation from the reaction chamber, wherein the process effluent includes syn-gas and carbon solids;
    separating the process effluent to produce a feedstream having carbon solids; and
    introducing the feedstream into the lance for partial oxidation of the carbon solids therein, wherein oxidation reactions come to completion within the lance to maintain an overall net-reducing state in the reaction chamber.

7. A method as recited in claim 6 further comprising the step of removing acids from the process effluent.

8. A method as recited in claim 6 further comprising the step of separating hydrogen from the process effluent.

9. A method as recited in claim 6 further comprising the step of compressing the effluent syn-gas.

10. A method as recited in claim 6 further comprising the step of introducing effluent syn-gas into the lance for reaction therein.

11. A method as recited in claim 6 further comprising the steps of:

accumulating molten material in the reaction chamber; and using effluent syn-gas to mix the molten material in the reaction chamber.

12. A method as recited in claim 6 further comprising the step of using a portion of the process effluent in an engine.

13. A method as recited in claim 6 further comprising the step of using a portion of the process effluent in a turbine.

14. A method as recited in claim 13 wherein the turbine generates waste heat and the method further comprises the step of using the waste heat to pre-heat a portion of the feedstock prior to disposing the feedstock portion into the reaction chamber.

15. A method as recited in claim 6 further comprising the step of transferring heat from the process effluent to a portion of the feedstock prior to disposing the feedstock portion into the reaction chamber.

\* \* \* \* \*